(12) United States Patent
Slade

(10) Patent No.: US 7,584,198 B2
(45) Date of Patent: Sep. 1, 2009

(54) DATA STORAGE

(75) Inventor: Glen Jonathan Slade, London (GB)

(73) Assignee: Stegostik Limited, London (GB)

( * ) Notice: Subject to any disclaimer, the term of this patent is extended or adjusted under 35 U.S.C. 154(b) by 91 days.

(21) Appl. No.: 10/588,657

(22) PCT Filed: Jan. 28, 2005

(86) PCT No.: PCT/GB2005/000309

§ 371 (c)(1),
(2), (4) Date: Aug. 7, 2006

(87) PCT Pub. No.: WO2005/078987

PCT Pub. Date: Aug. 25, 2005

(65) Prior Publication Data

US 2007/0186287 A1 Aug. 9, 2007

(30) Foreign Application Priority Data

Feb. 10, 2004 (GB) .................................. 0402909.6

(51) Int. Cl.
*G06F 7/00* (2006.01)
(52) U.S. Cl. ...................... 707/101; 707/9; 707/102; 707/205; 380/44; 380/282
(58) Field of Classification Search .................... 707/9, 707/101, 102, 205; 380/44, 282
See application file for complete search history.

(56) References Cited

U.S. PATENT DOCUMENTS

| 4,587,633 | A | * | 5/1986 | Wang et al. ................. 709/234 |
| 5,454,039 | A | * | 9/1995 | Coppersmith et al. .......... 380/28 |
| 5,613,004 | A | * | 3/1997 | Cooperman et al. ........... 380/28 |
| 5,636,292 | A | * | 6/1997 | Rhoads ....................... 382/232 |
| 5,687,236 | A | * | 11/1997 | Moskowitz et al. ............ 380/28 |
| 5,838,814 | A | * | 11/1998 | Moore ....................... 382/115 |
| 5,943,422 | A | * | 8/1999 | Van Wie et al. ................ 705/54 |

(Continued)

FOREIGN PATENT DOCUMENTS

WO 99/10859 3/1999

OTHER PUBLICATIONS

"StegFS: A Steganographic File System" HweeHwa Pang, Kian-Lee Tan, Xuan Zhou.*

(Continued)

*Primary Examiner*—Etienne P LeRoux
*Assistant Examiner*—Bruce A Witzenburg
(74) *Attorney, Agent, or Firm*—Nixon & Vanderhye P.C.

(57) ABSTRACT

A method of storing a data set on a storage device carrying a file of random data comprising the steps of: selecting, in dependence on a user input passphrase, a first location within the file of random data for storing a file index (FI); selecting a second location within the file of random data for storing the data set; encrypting the data set (D); storing the encrypted data set at the second selected location in the file of random data; making an entry in the file index in respect of the data set, the entry comprising an indication of the second selected location; encrypting the file index; and storing the encrypted file index at the first selected location in the file of random data. Also computer programs for carrying out such methods and storage devices arranged to operate using such methods.

73 Claims, 6 Drawing Sheets

U.S. PATENT DOCUMENTS

Figure 1A:
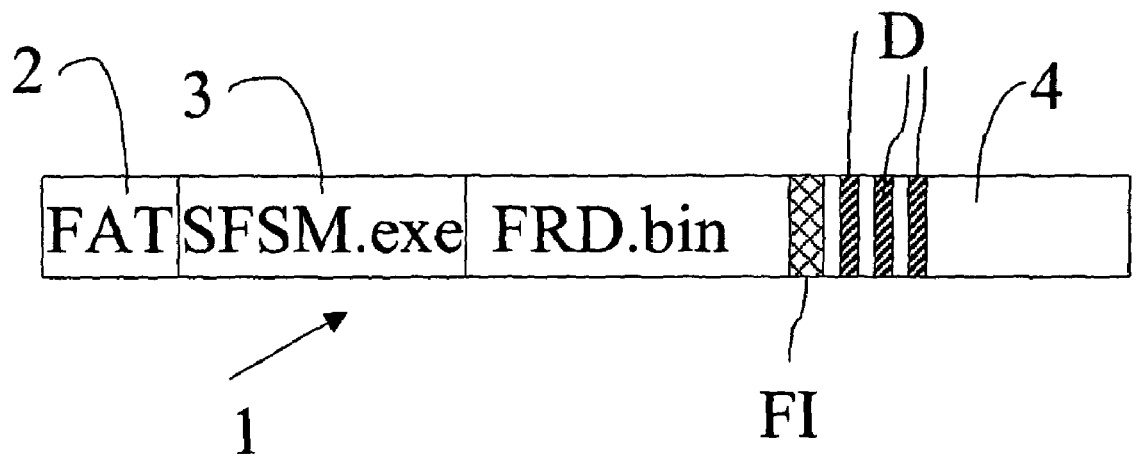

| | | | | |
|---|---|---|---|---|
| 6,011,849 | A * | 1/2000 | Orrin | 380/42 |
| 6,052,468 | A * | 4/2000 | Hillhouse | 380/281 |
| 6,122,403 | A * | 9/2000 | Rhoads | 382/233 |
| 6,185,683 | B1 * | 2/2001 | Ginter et al. | 713/176 |
| 6,249,866 | B1 * | 6/2001 | Brundrett et al. | 713/165 |
| 6,278,781 | B1 * | 8/2001 | Rhoads | 380/247 |
| 6,449,367 | B2 * | 9/2002 | Van Wie et al. | 380/232 |
| 2003/0126434 | A1 * | 7/2003 | Lim et al. | 713/164 |
| 2003/0163718 | A1 | 8/2003 | Johnson et al. | |

OTHER PUBLICATIONS

"The Steganographic File System" Ross Anderson, Roger Needham, Adi Shamir.*

"StegFS: A Steganographic File System for Linux" Andrew D. McDonald, Markus G. Kuhun.*

"GBDE—GEOM Based Disk Encryption" Poul-Henning Kamp.*

Pang et al., "StegFS: A Steganographic File System", Proceedings of the 19$^{th}$ International Conference on Data Engineering (ICDE'03), International Conference on Data Engineering, vol. CONF. 19, Mar. 5, 2003, pp. 657-667, XP010678776.

Anderson et al., "The Steganographic File System".

McDonald et al., "StegFS: A Steganographic File System for Linux", Workshop on Information Hiding Proceedings, IHW'99, Sep. 29-Oct. 1, 1999.

TruCrypt—Wikipedia, the free encyclopedia, http://en.wikipedia.org/wiki/Truecrypt, 2004 software (last modified Jun. 27, 2008).

TrueCrypt—Free Open-Source On-The-Fly Fisk Encryption Software, http://www.truecrypt.org/, (site updated May 20, 2008).

MaruTukku—Wikipedia, the free encyclopedia, http://en.wikipedia.org/wiki/MaruTukku, (prior to 2006).

* cited by examiner

| File | Edit | Tools | Window | Help |
|---|---|---|---|---|
| New file group... | Copy decrypted | Options... | Tile | Index |
| Open file group... | Copy encrypted | Utilities... | Cascade | About |
| Close file group | Paste | | 1st file group | |
| Properties... | Paste Special... | | | |
| Select FRD... | Delete (randomise) | | | |
| Deselect FRD | Delete (de-allocate) | | | |
| Exit | | | | |

DATA STORAGE

This application is the US national phase of international application PCT/GB2005/000309, filed 28 Jan. 2005, which designated the U.S. and claims priority of GB 0402909.6, filed 10 Feb. 2004, the entire contents of each of which are hereby incorporated by reference.

This invention relates to data storage. The methods, apparatus and programs described herein have particular applicability to use with removable storage devices but can also be used with fixed storage.

Much of the remaining discussion and description will be in terms of removable storage devices but the invention is not restricted to use with removable storage devices.

It is common practice for individuals and corporations to use removable storage devices (removable media) to achieve physical transfer of data between electronic devices such as digital cameras/camcorders, mobile phones and, in particular, general purpose computers.

As the capacity of such devices has grown and size decreased, the risk of mislaying confidential information has become significant. While it is possible using established commercial products to password protect and/or encrypt files, the existence of such files is still apparent, making them a target for malicious opportunists. This is the equivalent to having your valuables displayed in a locked unattended car; not without security but still unwise compared with concealing their existence.

Steganography is the science of concealing information. A benefit of steganography is that in contrast to the situation above, if files are stored using steganographic principles then the existence of the files themselves is not immediately visible to a third party. Thus, rather than the existence of the files, being recognisable and perhaps attracting attention, if steganographic techniques are used, the very existence of the files may go unnoticed.

There are many established methods for hiding relatively small files within much larger files, typically of sound or video. These techniques exploit the information redundancy in these large files. They are normally combined with encryption for additional security and are sometimes used for digital watermarks or fingerprints. U.S. Pat. No. 5,613,004 gives an example of such techniques. A drawback of these approaches is the large redundancy of data.

An alternative approach to steganography is to create a background of random numbers (such as filling a disc with random bits) and find some way of making the data to be concealed resemble random numbers (in that they pass established randomness tests).

Two mathematical results are relevant to this approach. The first is that the linear combination of any number with a random number yields another random number. The second is that a secure encryption algorithm produces cypher text indistinguishable from a random number.

In their theoretical paper "The Steganographic File System" (Information Hiding, Second International Workshop, IH'98, Portland, Oreg., USA, Apr. 15-17, 1998, Proceedings, LNCS 1525, Springer-Verlag, ISBN 3-540-653864, pp. 73-82.), Anderson, Needham and Shamir exploit each of these results. In their first method a file space is treated as comprising a fixed number of fixed size files which are pre-populated with random numbers. In that method storing a file involves XOR-ing a password derived sub set of these files with the user file and replacing one file with the result. Additional files can be stored using non-conflicting passwords. However, the system is too computation intensive to be used commercially. They therefore suggest a second method based on filling a disc with random data and hiding each block of data at a location determined by the password and file name. They identified the key drawback of this approach as being "collisions" between blocks resulting in a potential load of less than 20%, ie 80% redundancy. They proposed addressing this with a Larson table for files under a single password to give a load of about 85%.

In a paper "Steg FS: A Steganographic File System for Linux" (Proceedings, Third International Workshop on Information Hiding, Dresden, Germany, October 1999) MacDonald and Kuhn describe an implementation based on the above paper with some enhancements. An enhancement is the use of an encrypted file table which enables the whole disc to be used. However, because of the way this file table is implemented four drawbacks are apparent. Firstly, as the file table is in a known location it is a target for a known plain text or differential analysis attack. Secondly, the number of security levels is restricted to a fixed number, 16. Thirdly, the secret files are stored alongside non-secret files in an arbitrary way leaving data conflicts to chance and beyond user management. Fourthly, in an attempt to partially address the previous issue, the system stores multiple copies of all blocks increasing processing time and reducing total effective disc capacity.

It is an object of this invention to provide methods, apparatus and programs for storing data which alleviate at least some of the problems associated with the prior art.

According to one aspect of the present invention there is provided a method of storing a data set on a storage device carrying a file of random data comprising the steps of:
selecting, in dependence on a user input passphrase, a first location within the file of random data for storing a file index;
selecting a second location within the file of random data for storing the data set;
encrypting the data set;
storing the encrypted data set at the second selected location in the file of random data;
making an entry in the file index in respect of the data set, the entry comprising an indication of the second selected location;
encrypting the file index; and
storing the encrypted file index at the first selected location in the file of random data.

According to a further aspect of the present invention there is provided a method of operating a computer to store a data set on a storage device carrying a file of random data, the method comprising the steps of:
selecting, in dependence on a user input passphrase, a first location within the file of random data for a file index;
selecting a second location within the file of random data for storing the data set;
encrypting the data set;
storing the encrypted data set at the second selected location in the file of random data;
making an entry in the file index in respect of the data set, the entry comprising an indication of the second selected location;
encrypting the file index; and
storing the encrypted file index at the first selected location in the file of random data.

The step of selecting the first location for storing the file index may comprise the step of selecting the first location as a start point of the file index.

In this specification the expression passphrase is used to refer to any word, phrase or combination of characters which is used as a passphrase or password. There is no suggestion that the passphrase need be a "phrase".

It will be clear that there is little or no restriction on the data that may make up a data set, for example the data set may comprise software, application data, image files, word processor files and so on.

The encrypted data and/or encrypted file index may be stored directly at the respective locations.

Alternatively the file index may be stored at the first location in the file of random data by processing the random data using the encrypted file index. Similarly, the data set may be stored at the second selected location in the file of random data by processing the random data using the encrypted data set.

The step of processing the random data may comprise XOR-ing the encrypted data set and/or the encrypted file index with the random data.

The method may comprise the step of using the user input passphrase for generating a key for encrypting the file index. Thus the passphrase may be used to determine both the first location and the key for encrypting the file index. The passphrase may be used for generating a key for encrypting the data set. The passphrase may be used in selecting the second location.

Any one of or any combination of, the first location, the second location, the key for the file index and the key for the data set may be determined by using at least one hash function to operate on the user input passphrase.

The passphrase may be operated on once to produce an output which is used for determining at least two of the first location, the second location, the key for the file index and the key for the data set. The passphrase may be operated on a plurality of times, each operation generating an output for use in determining one of or a combination of the first location, the second location, the key for the file index and the key for the data set.

The same key may be used for encrypting the set of data as is used for encrypting the file index.

The method may comprise the step of storing further sets of data using the same passphrase. Where a plurality of data sets are stored using the same passphrase, the method can be such that a respective location for each data set is selected, each data set is encrypted and stored at the respective location, and respective entries are added to the file index.

The method may comprise the step of storing further file indexes within the file of random data, each of which indexes is associated with a respective passphrase and each of which indexes is encrypted and is stored at a location selected in dependence on the respective passphrase.

Again respective encryption keys may be generated from the respective passphrases and these respective keys may be used for encrypting data sets which are associated with each file index.

It will be appreciated that if the location of data sets and/or file indexes within the file of random data are unknown, there is a risk that storing a data set or file index will overwrite or partially overwrite an existing file index or data set. Such an event is termed a "collision" in this specification.

The locations for storage of a plurality of data sets using the same passphrase may be selected such that there are no collisions between data sets. This is facilitated because the file index associated with a given passphrase contains the details of all data sets which are being stored using the passphrase.

The method may comprise the step of selecting the passphrase for, and hence location for, an additional file index in the knowledge of all of the existing passphrases corresponding to file indexes already stored in the file of random data such that collisions may be avoided.

Where there are a plurality of file indexes stored in the file of random data, the method may comprise the step of selecting a location for an additional data set in the knowledge of all of the existing passphrases corresponding to file indexes already stored in the file of random data such that collisions may be avoided.

However, the method may also comprise the step of storing additional data sets using a passphrase whilst in ignorance of one or more other existing passphrase.

The method may comprise the step of storing data sets in a predetermined relationship to the respective file index to help prevent collisions. Data sets may be stored adjacent to the respective file index. Data sets may be stored substantially contiguously to the respective file index. Data sets may be stored at locations close to but after the respective file index. This can mean that if a plurality of file indexes are well spaced in the file of random data, then storing additional sets of data using one passphrase and in ignorance of one or more other passphrase (and hence in ignorance of the location of the respective file index or the location of their associated data sets), is less likely to cause collisions. The file of random data can be treated as a loop, such that a file index located towards the end of the file could have associated data sets stored at the start of the file.

The method may comprise the step of storing data on a storage device carrying a plurality of files of random data.

The or each file index may comprise a message authentication code. The message authentication code may be used to help recognise that a valid file index has been located and/or to allow detection of tampering with the file index. The file index may comprise a message authentication code of all associated data sets so as to facilitate the detection of tampering. The file index may comprise a message authentication code of the whole of the file of random data for use in detecting other usage of the file.

The method may comprise the step of pre-processing the data set prior to encryption. The pre-processing step can include compression and/or whitening of the data set. Pre-processing can help to ensure that the resultant cipher text resembles random data.

The method may comprise the step of presenting a user with an indication of the location within the file of random data that will be selected for the file index when using a predetermined passphrase. The method may comprise the step of accepting user entered trial passphrases and providing the user with an indication of the location within the file of random data that will be selected for the file index for each trial passphrase. The method may comprise the further step of providing to the user an indication of the regions of the file of random data that are already occupied by file indexes having passphrases that have been supplied by the user. An indication of the regions occupied by the data sets associated with the file indexes may also be provided to the user.

The method may comprise the step of receiving an indication from a user of a location within the file of random data which the user desires to use for a file index.

The method may comprise the step of suggesting possible passphrases to a user in response to a user indicating a location within the file of random data which the user desires to use for a file index.

The method may comprise the steps of receiving a user input passphrase and suggesting a modified passphrase.

The modification of the passphrase may be selected so as to move the location at which the associated index would be stored towards a desired location indicated by the user. The modification of the passphrase may be selected so as to strengthen the passphrase.

The indications given may be visual indications. In each case the indications given and/or provided with respect to a file index may be indications of a start point for the respective file index.

The method may comprise the step of deleting a data set stored on a storage device. The deleting step may comprise the step of removing the respective entry from the file index. The deleting step may comprise the step of overwriting the data set with random data as well as removing the entry from the file index. The method may comprise the step of reorganising data stored in association with a file index when one or more data set referenced in that file index is deleted. This can help to optimise disk block allocation.

The overwriting step may comprise the step of using the random data and/or encrypted data stored in the file of random data for generating pseudo-random data for overwriting deleted files.

The method may comprise the step of using random numbers from the file of random data that would be overwritten when adding a data set to replace any pseudo-random values previously used elsewhere within the file of random data.

According to another aspect of the invention there is provided a storage device carrying a file of random data in which file of random data is stored a file index and a data set, wherein the file index is encrypted and is stored at a first location determined by a passphrase, the data set is encrypted and is stored at a second location and the file index comprises an entry in respect of the data set, the entry comprising an indication of the second location.

The storage device may also carry software for use in the storing and extraction of data sets in the random data.

The passphrase may be used to generate a key for encrypting the file index. The encryption key may also be used for encrypting the data set.

The software carried by the storage device may be arranged such that when loaded and run by a computer, the computer is caused to carry out any one of, or any combination of, the following steps:
accepting passphrases, generating corresponding keys, and determining respective locations for storage of file indexes;
encrypting file indexes;
encrypting data sets;
storing file indexes;
selecting locations for data sets;
storing data sets;
accepting passphrases and locating and decrypting respective file indexes;
locating and decrypting data sets;
retrieving data sets.

The storage device may further carry a conventional file allocation table. This can facilitate the file of random data and/or software being treated as standard files by a computer operating system.

The storage device may comprise a portion of Read Only Memory (ROM). The file allocation table may be carried in the ROM portion of the storage device. The software may be carried in the ROM portion of the storage device. An operating system header file for the file of random data may be carried in the ROM portion of the storage device. This can help prevent a user from modifying or deleting the software or random data file without specialist tools.

The storage device may be a removable storage device. Examples of such devices include Re-Writable CDs, Re-Writable DVDs flash memory devices for example USB-memory sticks, and so on.

The use of flash memory devices is particularly preferred. This is because such devices tend to exhibit less forensic traces when used.

The removable storage device may be supplied to the user sealed to help to prevent tampering.

The removable storage device may have a unique serial number.

The removable storage device may carry a unique hard coded identifier which is used in the encryption and/or decryption process.

The removable storage device may be sold with a pretext for at least one use. This pretext may for example be that a proportion of storage devices sold will have an associated prize which can only be claimed after at least one use of the device.

According to another aspect of the present invention there is provided a computer arranged under the control of software for storing a data set on a storage device carrying a file of random data using the steps of:
selecting, in dependence on a user input passphrase, a first location within the file of random data for the storing a file index;
selecting a second location within the file of random data for storing the data set;
encrypting the data set;
storing the encrypted data set at the second selected location in the file of random data;
making an entry in the file index in respect of the data set, the entry comprising an indication of the second selected location;
encrypting the file index; and
storing the encrypted file index at the first selected location in the file of random data.

The computer may be arranged under the control of software to present a user with an indication of the location within the file of random data that will be selected for storing the file index when using a predetermined passphrase. The computer may be arranged under the control of software to accept user entered trial passphrases and provide the user with an indication of the location within the file of random data that will be selected for storing the file index for each trial passphrase. The computer may be arranged under the control of software to provide the user an indication of the regions of the file of random data that are already occupied by file indexes having passphrases that have been supplied by the user. An indication of the regions occupied by the data sets associated with the file indexes may also be provided.

The computer may be arranged under the control of software to suggest possible passphrases to a user in response to a user indicating a location within the file of random data which the user desires to use for storing a file index. The computer may be arranged under the control of software to find suitable passphrases to suggest by a process of trial and error. The computer may be arranged to suggest a modified passphrase based on a user entered passphrase.

The indications given may be visual indications. The computer may be arranged under the control of software to present a user interface for displaying the indications. The user interface may also be arranged so that a user can use a pointing device to indicate the location within the file of random data which the user desires to use for storing a file index.

According to another aspect of the invention there is provided a method of extracting a data set stored on a storage device in a way defined above, the method of extracting data comprising the steps of:
accepting a user input passphrase;

determining the location for a file index indicated by the passphrase;

decrypting the file index;

identifying the location of the requested data set from the file index; and decrypting the data set.

According to another aspect of the invention there is provided a computer arranged under the control of software to extract data using the method defined above.

According to yet another aspect of the invention there is provided a method of storing a data set on a storage device carrying a file of random data comprising the steps of:

selecting, in dependence on a user input passphrase, a first location within the file of random data for storing a file index;

selecting a second location within the file of random data for storing the data set;

encrypting the data set;

storing the data set at the second selected location in the file of random data;

making an entry in the file index in respect of the data set, the entry comprising a indication of the second selected location;

encrypting the file index; and storing the file index at the first selected location in the file of random data, wherein the method comprises the further steps, prior to finalising the user input passphrase, of accepting at least one user entered trial passphrase and providing the user with an indication of the location within the file of random data that will be selected for the file index associated with the at least one user entered trial passphrase.

According to another aspect of the present invention there is provided a computer program comprising code portions which when loaded and run on the computer cause the computer to carry out a method as defined above.

The computer program may be carried on a computer readable data carrier, such as a signal or a storage device, for example a DVD-Rom, a CD-Rom, a USB Memory Stick, a hard disk and so on.

It should be noted that most if not all of the subsidiary features described above following one statement of invention are similarly applicable to the other statements of invention, and it is for the sake of brevity that such subsidiary features are not all restated. In particular, it will be appreciated that in general the apparatus and/or programs may be arranged to carry out and/or allow any subsidiary features of the methods. Further methods, apparatus and programs for extracting data sets may include the same subsidiary features (reversed where necessary) as those for storing data.

Figure 1C:
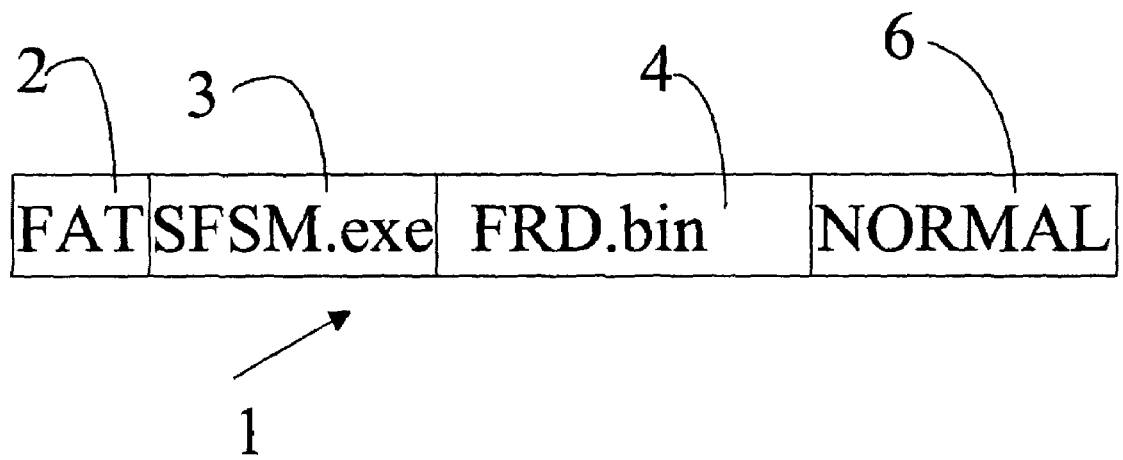
Figure 1B:
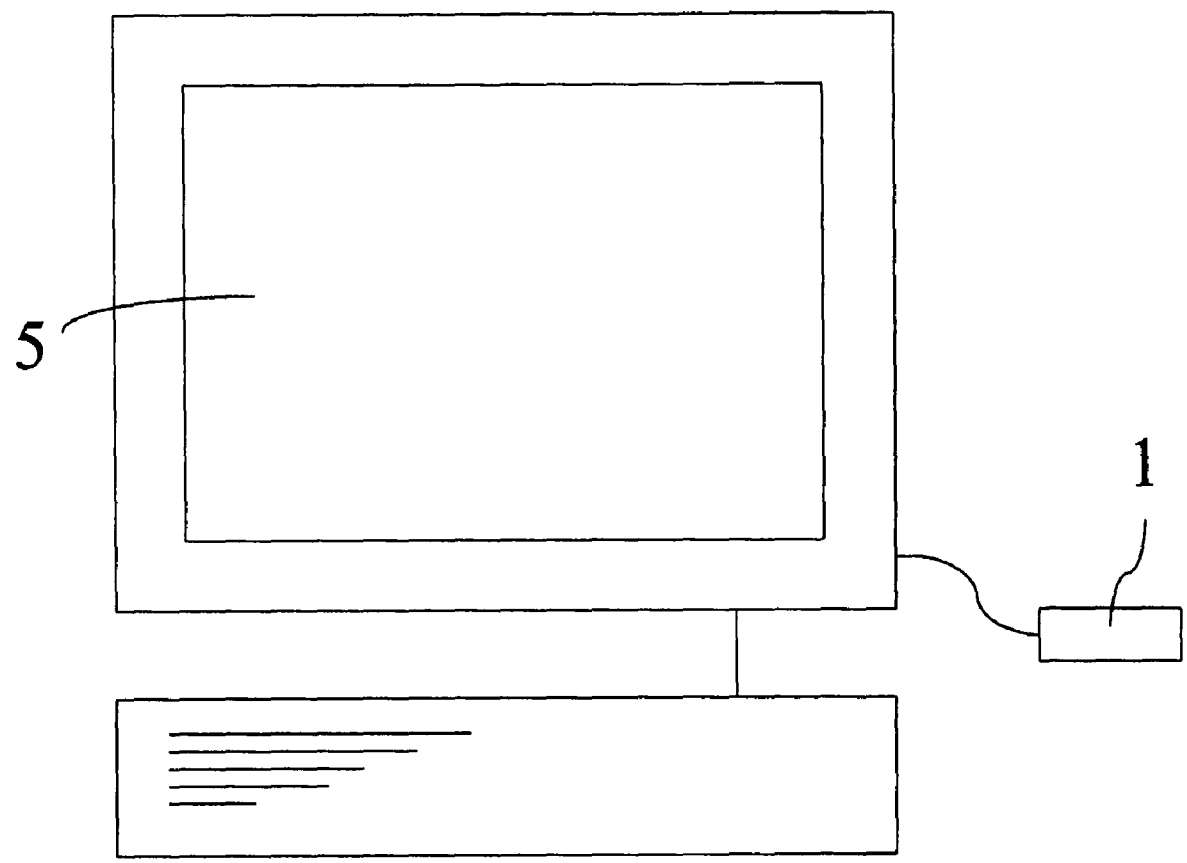

An embodiment of the present invention will now be described by way of example only with reference to the accompanying drawings in which:

FIG. 1A schematically shows a data storage device embodying the present invention;

FIG. 1B shows the removable storage device of FIG. 1A connected to a computer.

Figure 2:
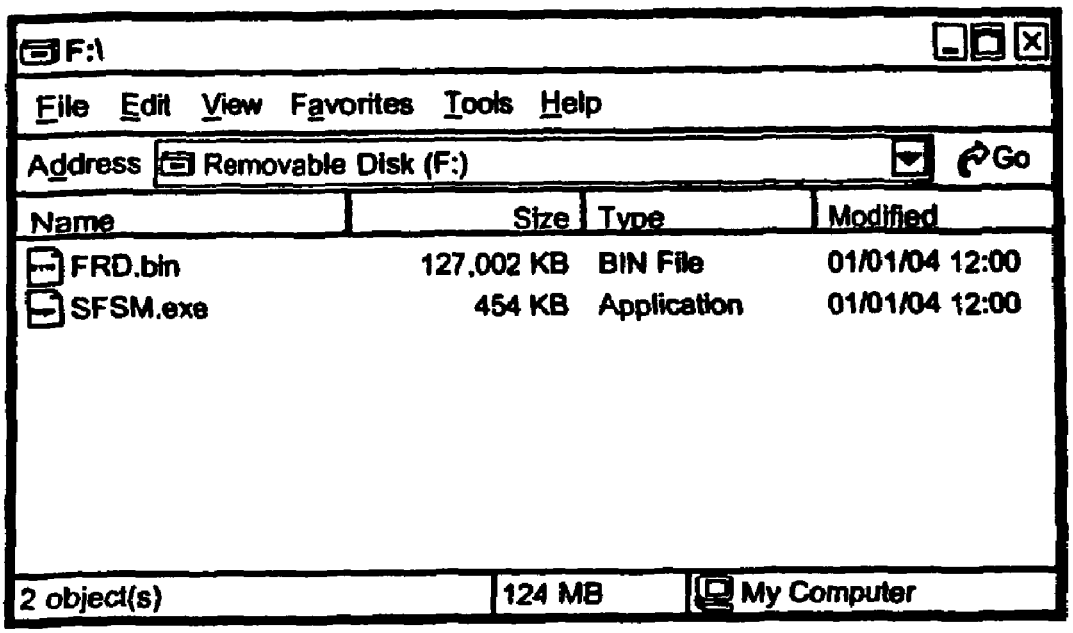
Figure 3:
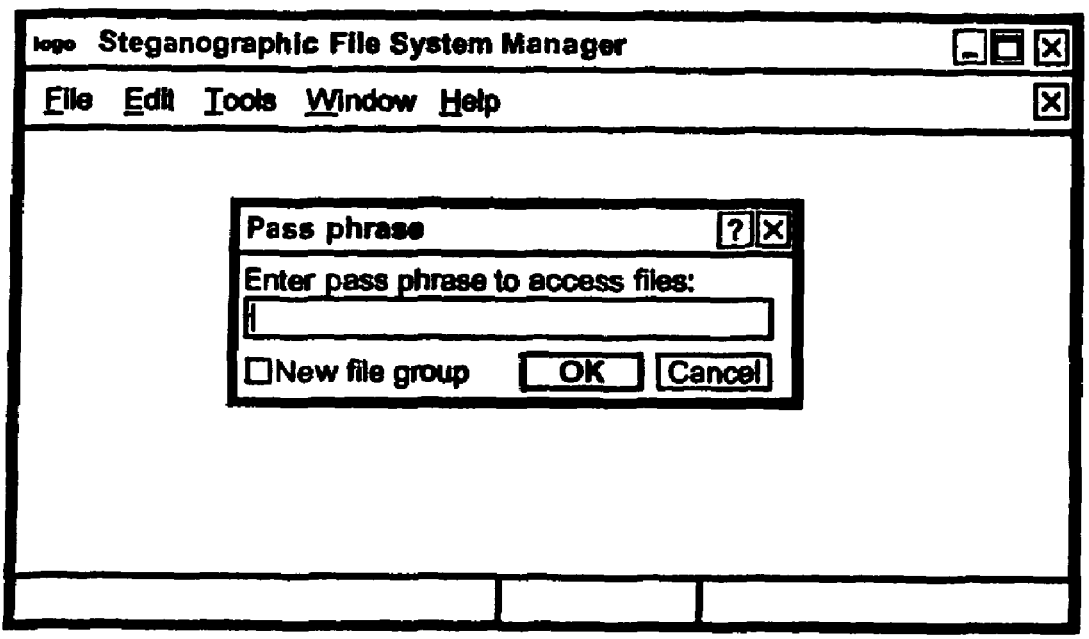
Figure 4:
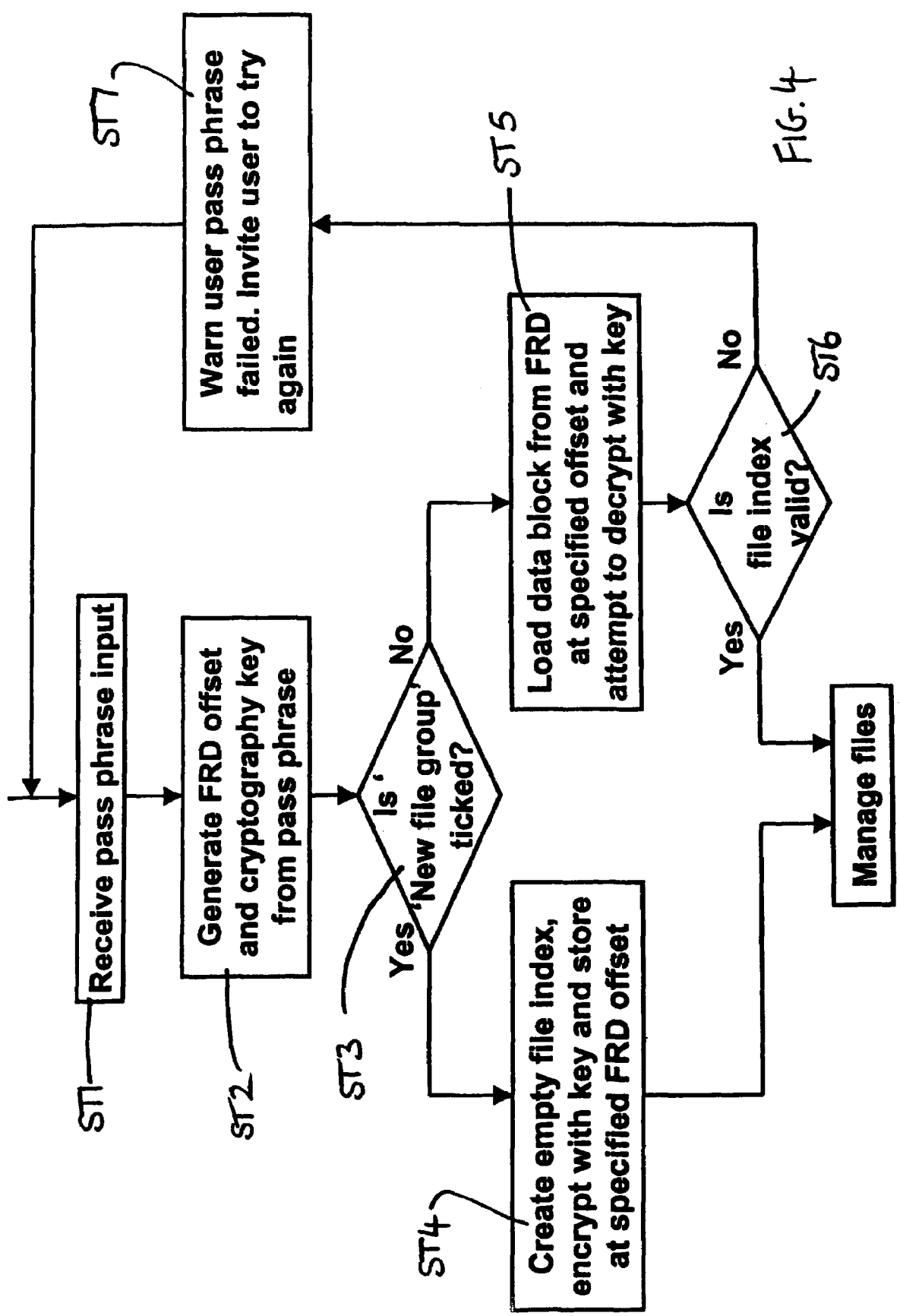
Figures 5, 7:
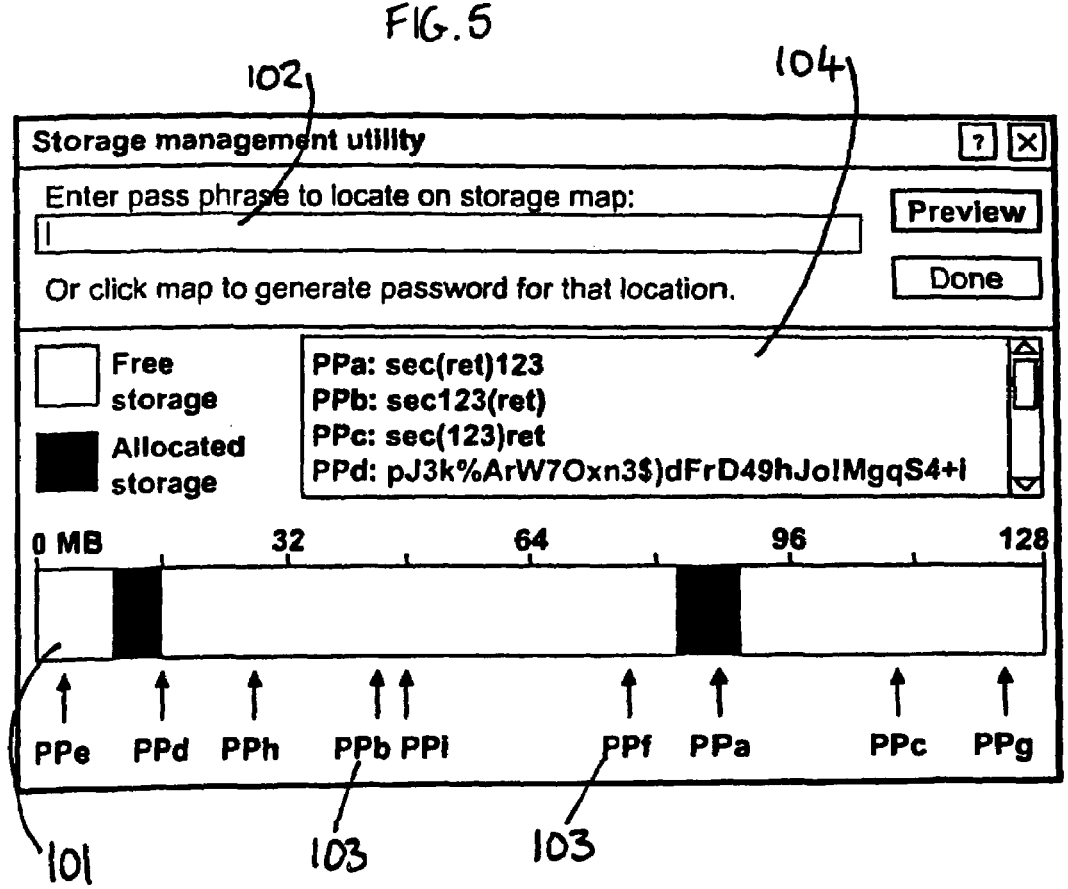
Figure 6:
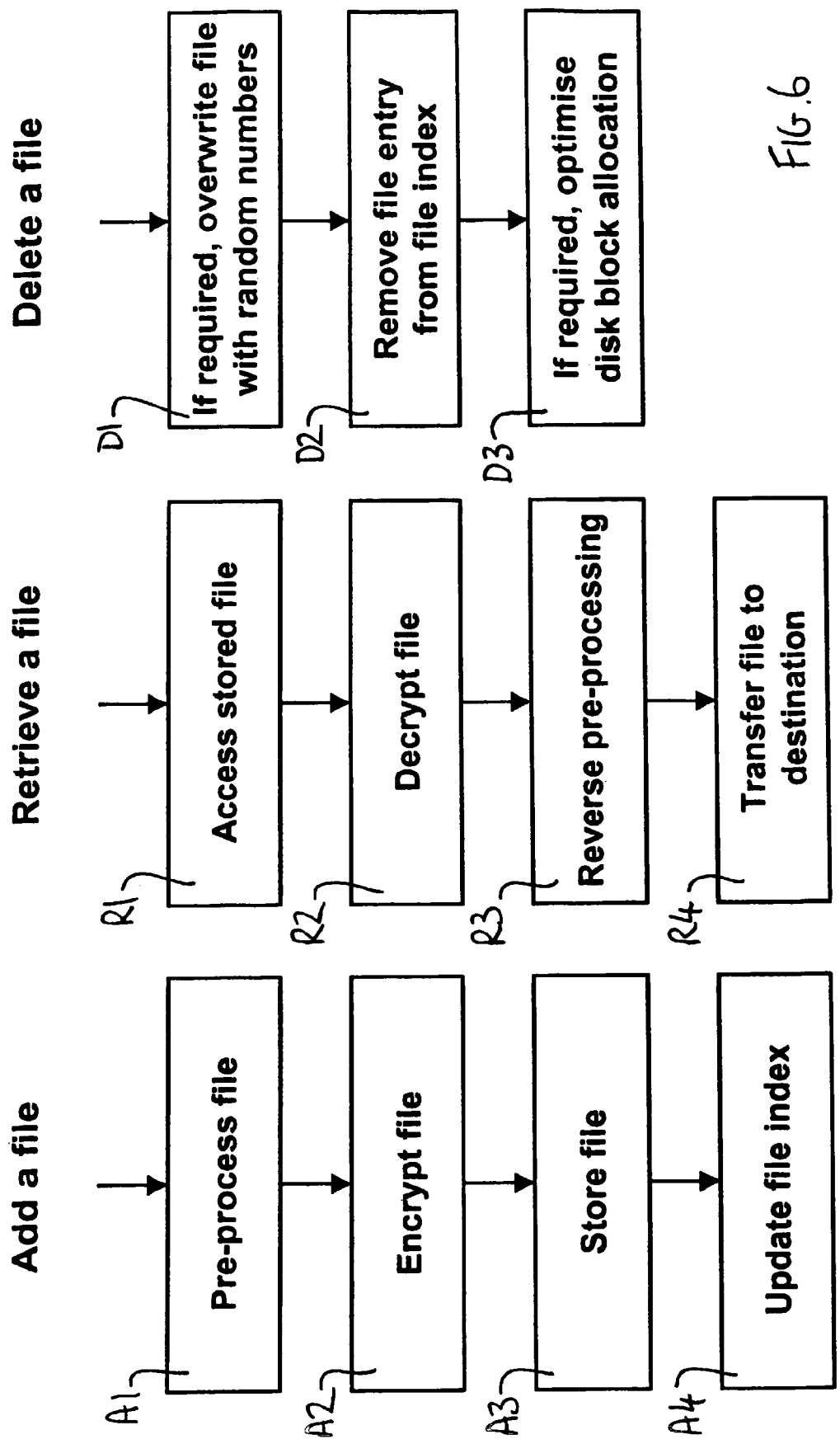

FIG. 1C schematically shows an alternative data storage device embodying the invention;

FIG. 2 schematically shows a file listing for the data storage device shown in FIG. 1;

FIG. 3 schematically shows an initial screen presented by software embodying the present invention;

FIG. 4 shows a flow chart illustrating the processes which occur when a passphrase is entered into a computer operating in accordance with an embodiment of the present invention;

FIG. 5 schematically shows menu choices available when using software embodying the present invention;

FIG. 6 schematically shows processes which are undergone in managing files using a system embodying the present invention; and FIG. 7 schematically shows a storage management utility which forms part of a system embodying the present invention.

The present specification relates to data storage, and in particular to methods, apparatus and programs for storing data whilst making use of steganographic techniques.

The methods, apparatus and programs relate to file systems which can be used to not only encrypt data but also obscure its very existence. The aim is to provide a steganographic file system for use on a data storage device which provides the following features:

a) no evidence whether any file at all is stored in the data storage device;

b) no indication where to start looking for a file or file index;

c) 100% potential storage device utilisation;

d) little or no limit on the number of security levels, and e) ability to manage storage mapping to reduce potential collisions.

The present file system may be used on fixed storage devices as well as removable storage devices of many different kinds. However, for the sake of simplicity the remainder of this description will be written mainly in respect of the situation where the storage device comprises a USB flash memory stick.

File systems of the present kind may be used with many different operating systems but again for the sake of simplicity the remaining description is written on the assumption that the file system and storage device is to be used with devices running a Microsoft Windows operating system.

In some implementations, the present method, apparatus and programs may be arranged to selectively allow use with different operating systems and environments. Thus as a specific example, a storage device embodying the invention may carry a plurality of software applications, each application being arranged for running the file system of the present specification under a respective operating system/environment. Thus, for example, a USB flash memory stick may carry multiple different versions of an executable file (eg SFSM.EXE—see below), say one for Windows, one for Mac, one for Linux and so on.

FIG. 1A schematically shows a USB flash memory stick 1 set up for use in an embodiment of the present invention. The storage area of the memory stick 1 can be considered to carry three main components. First is a conventional file allocation table 2. The second is a software application 3 for running the file system of the present specification (called SFSM.EXE) and the third is a file of random data 4 (called FRD.BIN).

It should be noted that the provision of these three components together on the removable storage device 1 is a preferred construction but is not essential. In particular, the application 3 for running the file system could be provided elsewhere, for example on a computer or other device with which the movable storage is to be used.

Furthermore, if the invention is used with non-removable storage the configuration could again be different.

However, whatever the configuration, the basic principles will be the same. The application software 3 serves to interact with the operating system provided on the device with which the storage device is to be used to allow the storing of data to, and extracting of data from, the storage device. More particularly, the application 3 allows the storing of data amongst the random data in the random data file 4 and the extraction of any such stored data.

The basic operation of the present methods and devices can be explained as follows:

When data is to be stored to the memory stick 1 a passphrase must be provided. This passphrase is used by the application 3 to determine a location or "offset" within the random data file 4 at which a file index should be located. The application 3 also operates on the provided passphrase in order to provide an encryption key. The application 3 then uses this encryption key to encrypt the data to be stored and this encrypted data is then stored at a location selected by the application 3 at some point in the random data file 4. An appropriate entry is also made in the file index which gives details of the data being stored and details of the location at which the data is stored. This file index is then also encrypted using the same key and stored at the determined location.

If this data is to be later extracted from the memory stick 1 the same passphrase must be provided to the application 3. Using this passphrase the application 3 is able to locate and decrypt the file index. From the file index, the application 3 is able to determine the location of the stored data and again using the encryption key the application 3 is able to decrypt this stored data and present it to the operating system of the device which is accessing the USB memory stick 1.

FIG. 1A schematically shows a file index FI and associated data D located in the file of random data 4.

FIG. 1B schematically shows the memory stick 1 connected to a general purpose computer 5. With such an arrangement the computer 5 is the device accessing data on and/or storing data to the stick 1.

In the case of the USB memory stick 1 shown in FIG. 1A the random data file 4 fills all of the available space on the memory stick 1 besides that occupied by the file allocation table 2 and application 3.

FIG. 1C schematically shows an alternative removable storage device. In this alternative memory stick, the random data file 4 has a more limited size such that the USB memory stick 1 is provided with some conventional storage space 6. When a storage device 1 is configured in this way, the application 3 may be used to store data in only that portion of the device which is occupied by the random data file 4 whereas the normal storage mechanisms provided by the operating system of a connected device, e.g. of the computer 5, may be used to store files conventionally in the remaining portion of the memory stick 6.

In yet further alternatives two or more files of random data 4, may be provided on a single storage device 1.

The preferred course of action is to supply USB memory sticks 1 preloaded with random data in the random data file 4.

Ideally the preloaded data in the random data file 4 will be truly random or encrypted truly random. This avoids attacks based on the pseudo-random numbered generation algorithm. Note however, that every device will contain different random data confounding attempts to determine whether the medium has even been used.

It is also suggested that each USB memory stick is physically sealed by the supplier to prevent tampering with the random data file 4 before it reaches the customer. Another non-essential suggestion is that the supplier might also create a pretext for inserting and removing the device 1 so that physical traces of insertion can be explained. One such pretext would be for a small number of the devices to indicate a prize winner on insertion and after entry of a special passphrase.

USB memory sticks typically use daisy chained flash memory elements giving the further benefit that there are no physical traces of data alteration as would typically be found on magnetic media.

The USB memory stick 1 includes a space on which the user can write their contact details both for identification and in case of loss. However, noting that it may be undesirable to make markings that indicate the contents of a stick, an alternative would be for each stick to be preprinted with a serial number so that the user can associate this with the contents.

Whilst not a feature of this embodiment, a further development would be for each hardware device and/or software instance to have a unique hard coded identifier that is used as part of each and every encryption key which is used with that device or software instance. This could help prevent some types of attack or counterfeiting.

In a further development, the USB memory stick 1 can contain one or more hardware modifications. For example, it can contain circuits to accelerate certain algorithms including hashing, encryption, decryption, compression and decompression. Another development is for the memory stick to include a portion of Read Only Memory and for the file allocation table 2, the application 3, and a windows header file of the random data file 4 to be stored in ROM. Doing this would help prevent various types of tampering with the storage device and would ensure that the storage device could only be used for encrypted storage. However, doing this creates a barrier to using bug fixes and plug-ins for the application 3. However, as a way round this, the application 3 could allow the user to activate specified files including any stored and encrypted within the random data file 4.

It will be noted that whilst these characteristics and developments have been described above in relation to the USB memory stick, these ideas, in general terms, are equally applicable to many different types of removable storage device which may be used.

As far as the Windows operating system on the computer 5 is concerned, the memory stick 1 behaves as a conventional USB memory stick. Therefore, when the memory stick 1 is connected to the computer 5 a default driver is activated which causes the memory stick to become a new storage device that can be referenced seamlessly.

FIG. 2 schematically shows the file listing of the memory stick 1 as it is displayed on the screen of the computer 5 to a user. In the present embodiment the application 3 file (SFS-M.EXE) is visible as is the file of random data (FRD.BIN). However, in practice it may be decided to change the status of the file of random data so it is invisible to a user.

It should also be noted that there is no way of telling from this file listing whether or not this memory stick 1 has ever been used. That is to say it is not possible to tell whether there is any user data stored on the memory stick 1 and if so how much. The memory stick 1 is configured such that the modified dates in the file listing will not change even if the memory stick 1 is used. In the present embodiment this is achieved by the application 3 overwriting the modified data with a standard value after Windows has updated the date in the conventional manner. Of course, if the file allocation table is held in ROM, this step is not needed.

As mentioned above, in the case of the memory stick 1 shown in FIG. 1A all of the available storage space has been occupied by the file of random data 4 so any attempt to save an additional file conventionally to this drive would fail.

In this preferred embodiment once the memory stick 1 has been connected to the computer 5, the application 3 auto runs so that usage of the memory stick 1 is as seamless as possible for the user. In an alternative however, the application 3 may be activated manually by, for example, double clicking on the SFSM.EXE file.

Once the application 3 is running it detects that it is on the same device as the file of random data 4 and assumes that this is to be used. At this stage the application 3 presents a pass phrase entry screen which is schematically shown in FIG. 3. It will be noted that the application 3 does not know whether the file of random data 4 contains any valid data. It is only once a passphrase has been entered and processed that an indication is given as to what, if any content there is on the memory stick 1.

If the memory stick 1 has not been used previously then it will be necessary to set up a new file index at an appropriate location rather than trying to access an existing file index. Therefore, as can be seen in FIG. 3, the user is provided with a tick box which can be used to indicate that the user wishes to create a new file group, such that a new file index should be created in response to the passphrase supplied.

FIG. 4 is a flow chart showing the processes followed by the application 3 after the presentation of the initial input screen shown in FIG. 3.

In the first step of this process ST1 an input passphrase is received. In the second step ST2, the application 3 uses this received passphrase to generate an offset within the file of random data at which the file index should be located and further generates a cryptographic key. Both the offset and the cryptographic key are generated from the input passphrase and in this embodiment this is achieved by using one or more hash functions to operate on the passphrase.

The size of the cryptographic key and other features of it (such as disallowed values) will be determined by the selected cryptographic algorithm. In the present embodiment the cryptographic algorithm used is determined when the memory stick is manufactured. However, in alternative implementations there may be a choice of cryptographic algorithms presented to the user which are either included on the memory stick at manufacture or added to the memory stick 1 at a later time.

In further alternatives, where there is a choice of cryptographic algorithms, the choice of which cryptographic algorithms to use may be determined by the program running the file system. The choice may be made in dependence on the passphrase selected. The choice may involve an assessment of the strength of the passphrase. The choice may involve a determination of the length and/or type of characters included in the passphrase. The assessment may comprise the step of calculating or estimating the number of possible passphrases there are for a passphrase of the selected length and/or character set present. Thus if a three letter, all lower case, passphrase is used the number of possible passphrases would be 26×26×26=17576—this is a low strength passphrase and would lead to selection of a low strength encryption algorithm. If a passphrase is used which has 10 characters and includes upper and lower case and numerals, the character set is set say to 62 (26+26+10=62) and number of possible passphrases is then 62^10—this is a much stronger passphrase, for which a stronger encryption algorithm would be selected. The idea here is one of appropriateness. If a low level passphrase is used, it is assumed inappropriate to use a strong and hence slower encryption technique and vice versa.

In a third step of the process ST3, a determination is made as to whether the new file group check box is ticked. If the answer is yes then in step ST4 the application 3 creates an empty file index, encrypts this with the generated key and stores it at the specified location determined by the calculated offset in the file of random data 4.

If in step ST3 it is determined that the new file group checkbox is not ticked, then in step ST5, the application 3 accesses the data located in the random data file 4 at the location specified by the calculated offset and attempts to decrypt this using the calculated key.

In step ST6 a determination is made as to whether a valid file index has been found. The determination as to whether a valid file index has been found is made by analysis of the data structure extracted and by checking for the presence of a message authentication code which is stored with each file index when written to the stick.

If in step ST6, it is determined that no valid file index is found, a message to this effect is generated in step ST7 and presented to the user. Of course the reason why no valid file index was found could be because a wrong or incorrect passphrase was used or because this was in fact a new device. The indication generated in step ST7 for presentation to the user invites the user to try a different passphrase or tick the new file group check box.

On the other hand, if a valid file index is found in step ST6, or alternatively the new file group checkbox was ticked and an empty file index was successfully created in step ST4, then the application 3 is ready to manage files and this initiation process as illustrated in FIG. 4 is complete.

If the user clicks cancel on the passphrase entry dialogue box as shown in FIG. 3, the application presents an empty window to the user and he may proceed no further at that time.

There are various developments which may be made to this part of the process. In particular, in a desirable alternative the application 3 is arranged to warn the user if weak passphrases are chosen. The user might also be given the choice of various encryption algorithms and/or the application may be arranged to try one or more algorithms if the initial attempt to decrypt the file index fails. The application 3 could be arranged to accept plug-in software modules that provide alternative algorithms.

FIG. 5 shows the menu options presented to the user by the application 3 once they have successfully gone through the process described above in relation to FIG. 4.

The file menu as shown in FIG. 5 reflects the fact that in this embodiment each instance of the application 3 is arranged to work with a single file of random data 4. Within each instance of the application 3 different windows are used for different file groups. In this sense a file group is all of those files which are controlled using a single pass phrase.

It is envisaged that normally a user will work only with the single default file of random data 4. However, in some situations a user may wish to work concurrently with more than one file of random data 4. These situations include those where files are being transferred between two different removable storage devices 1 and where efficiency considerations have resulted in more than one file of random data 4 being placed on a single (large) removable storage device. The application allows the user to use the file menu to select which file of random data 4 to use (the "select FRD . . . " option). The application also allows the user to conceal which file of data was in use by the provision of the "deselect FRD" option.

Once a user has selected a different file of random data 4 to which they wish to store information or from which they wish to extract information, the user can select the open file group option or the new file group option from the file menu and from this point can access or create a new file group under control of a passphrase. The effect of selecting "new file group" or "open file group" is the same except the "new file group" check box of the initial screen shown in FIG. 3 is preselected if new file group is chosen. The process used at this time is the same as that described above in relation to FIG. 4.

In any one given file of random data 4 it is possible to open an arbitrary number of file groups each of which has its own associated passphrase. The present system includes mechanisms to help avoid data collisions and these are described further below.

When a number of different file groups are open, each has its own window and the user can switch between the windows using the standard window menu options. In the present embodiment each file group appears under the window menu labelled "first file group", "second file group" and so on. In a development the application 3 can be arranged to support naming of each file group rather than labelling them first, second, etc. However, it is obviously not appropriate to refer to the file groups by their passphrases. When a file group has been finished with it may be closed by the user selecting the close file group option.

Any instance of the application 3 may be terminated by selecting exit from the file menu.

Once the user has opened at least one file group within a selected file of random data 4, the user can move files into or out of the steganographic file system. As alluded to above, the application 3 sits between the steganographically stored data in the file of random data 4 and the operating system of the computer 5 to which it is connected and facilitates the adding, removal or deletion of files from the steganographic file system by the user.

In the present embodiment, the file index indicates what files are stored (file name, extension, size and modified date) and where they are located within the file of random data 4 (in terms of disk blocks occupied). The file index may be of variable length provided that the initial data block is in the position specified by the offset algorithm described above.

In the present embodiment, the sets of data stored by the user in the steganographic file system are stored contiguously after the file index (treating the file of random data as circular or as a loop). This facilitates overall storage management without compromising the security of the system.

In an alternative, passphrases may be deemed hierarchical with each subsequent level having a file index capable of avoiding lower level file areas. However, this connects together the different file groups since the existence of files in lower security groups or at least the existence of those other security groups is apparent when accessing the higher security groups.

In another development the user could specify a lower density of data storage within the file of random data to make the system harder to attack.

In yet another alternative, the file system could be used to create redundancy, for example by saving multiple copies of differently encrypted versions of stored data sets. This technique can allow for some data corruption be this malicious or otherwise.

FIG. 6 is a flow diagram showing the operations of adding, removing and deleting files from the present steganographic file system.

The process of adding a file to the present steganographic file system (i.e. storing a data set) involves four main steps. In step A1 the file to be added is preprocessed, this preprocessing is used for compression and/or whitening of the file. This ensures that the subsequent encryption step A2 will yield secure cypher text (i.e. data that resembles random data). It also gives an opportunity to encode the files properties (created date, read only and archive attributes etc.).

Once the final length of the encrypted file is known, the application 3 can check that this does not cause corruption of data in any other open file groups. Assuming that there is no conflict the file is stored at step A3. The file is stored within the file of random data 4 at locations which are specified by the file index in accordance with its storage allocation algorithm.

Finally, in step A4, the file index is updated to reflect the presence of the new file. The step of updating the file index of course involves processing the contents of the file index, encrypting the updated file index, and re-storing the file index at the location determined by the associated passphrase.

Retrieving a file from the steganographic file system (without deleting it) also involves four steps which are in general terms the inverse of those used for adding file. Firstly in step R1 the appropriate file index is consulted to determine the location of the requested data and then the relevant data blocks in the file of random data 4 are accessed. In step R2 these blocks of data are decrypted. In step R3 the preprocessing applied in step A1 when adding the file must be reversed and finally in step R4 the resulting file can be passed to the application which requested it.

When deleting the file there are a number of different approaches which can be taken. Which is chosen depends on degree of security which is desired by the user. At the simplest level then all that is required is to remove the entry relating to the file which is to be deleted from the respective file index and mark the associated disk blocks as available. However, if this is done then if the file group were ever compromised a competent person could retrieve the deleted file.

Therefore in the present embodiment in a first deletion step D1, if it is required by a user, the file is first overwritten with random data. In step D2 the file entry is removed from the file index. After this has been done then, upon the choice of the user, there is another optional step D3 which may be carried out. This step D3 involves reorganising the data stored within the file group to optimise disk block allocation.

This reorganisation step has advantages because without it, the removal of the entry from the file index in D2 alone will typically not free up storage for use by other file groups.

There is a second problem which can arise when deleting files, that is that the data which results from deleting the file, even if it is first overwritten with random numbers in step D1, may differ in some way from the background unused areas of the file of random data 4 or the stored files. If there is such a difference then this will give an indication that files have been stored and deleted.

In developments, techniques may be used to make use of the random data and/or encrypted data already in the file of random data to generate high quality pseudo-random data for overwriting deleted files.

In an alternative development the user could be given the option of de-allocating the storage blocks which have previously been used and thus reducing the overall size of the file of random data 4. Once these blocks have been de-allocated they could be used for conventional storage. However, the process of doing this would generally leave greater evidence of usage of the storage device and thus is probably an undesirable option.

In another possible development, the file of random data could be self-repairing in the sense that when a file is added the true random numbers that would be overwritten are used to replace any pseudo-random values previously used elsewhere within the file of random data 4.

Some description of the operation of the file management application 3 as seen through the eyes of the user when manipulating files will now be given.

The application 3 is arranged to support drag and drop movement of files from conventional storage to the present steganographic file system as well as movement within the steganographic file system. The application 3 also supports manual file transfer via the clipboard.

The application also provides the facility for copying files whilst retaining encryption as well as copying files after decryption.

The transfer of files whilst still encrypted would be particularly useful when transferring files between file groups using the same passphrase. Of course these file groups could be present on different storage devices. As an example a user might have a file group within a steganographic file system according to the present specification on his hard disk and also one on a removable storage device such as a memory stick. Where the passphrase for these two file groups is the same, movement between them can be done without decrypting and re-encrypting the files themselves.

The paste function provided to the user would automatically preprocess and encrypt files as they are pasted whereas the paste special option would enable greater control over the process.

The issue of maintaining more than one file group within a file of random data where each file group has a different passphrase is considered below.

It will be recalled that the location of a file index and hence its associated data files are determined by the passphrase which is used. Therefore, in the present embodiment a storage management utility is provided. This utility can be used by a user to make best use of the storage capacity of the file of random data 4. FIG. 7 shows the user interface of the storage management utility of the present embodiment.

At the most basic level the idea of the storage management utility is to give a visual indication to the user of the areas of the file of random data 4 which have been used or allocated and also show those areas which are free for use.

The user interface comprises a storage availability display bar 101 in which the free and allocated storage is shown, the allocated storage blocks being shown in black.

The display bar 101 only shows allocated storage in respect of passphrases which have already been provided by the user. That is to say the user must provide the passphrases to the storage management utility in order for it to be able to display which areas of the file of random data 4 have already been used. Thus to give full functionality the storage management utility relies on the user knowing all of the passphrases which have been used on this particular storage device i.e. the memory stick 1.

The storage management utility also comprises a passphrase entry field 102 which the user can use to enter a trial passphrase. Once a passphrase has been entered via the passphrase entry field 102, the location of the file index which would result from the use of this passphrase is indicated by a label 103 provided alongside the memory display bar 101. The labels 103 are indicative of a particular passphrase which has been entered and the actual passphrase used to achieve this location is shown in a passphrase display pane 104. Thus, in the example shown in FIG. 7, label 103 referenced PPa corresponds to a passphrase of sec(ret)123.

As well as the storage management utility allowing the user to enter test passphrases via the entry field 102 the user can also cause the utility to generate passphrases by clicking on a desired area of the memory display bar 101.

If the user clicks on the memory display bar 101, the storage management utility searches through passphrases systematically until it finds one arbitrarily close to the location clicked on by the user. At the simplest level the utility can be configured to suggest passphrases of arbitrary complexity. In preferred versions, the utility can be configured to suggest more user friendly passphrases such as those based on combinations of real words. In alternative or addition the utility can be configured to add one or more character to a user provided passphrase, or suggest one or more character that may be added to a user provided passphrase. Characters to be added may be selected by the utility to improve strength or move the location of the file index closer to a desired location indicated by the user.

Once the user is provided with this facility he can make decisions as to how best to utilise the storage available in the file of random data 4. As an example, suppose a user requires two storage areas. One of these is frequently modified and one has a fixed file set. In this case it makes sense to store the fixed file set just behind the frequently used file set so that the latter can expand as far as possible before colliding with the former. This way of thinking can of course be generalised to managing multiple file groups with varying usage profiles.

In principle the user can optimise storage and achieve close to 100% utilisation with an almost unlimited number of passphrases or file groups.

In the example shown in FIG. 7 the user has already established two file groups on the storage device (memory stick 1) in use. These are shown by the black areas on the display bar 101. In this instance the user wants a passphrase that gives a location just after the lefthand allocated block. He first makes attempts by entering passphrases PPa, PPb and PPc via the entry field 102. As can be seen from the labels 103, these are not close enough to the desired location. At this point the user clicked on his desired location and the storage management utility generated another passphrase PPd using a systematic process of trial and error. The passphrase PPd is very close to the desired location but is hard to memorise. However, in certain circumstances a passphrase suggested by the utility can help lead the user in the right direction to choosing a memorable passphrase which gives a desired location. In this case further attempts PPe to PPi have been made.

In the present embodiment the user selects done when he has finished with the tool. At that stage he can manually set up a new file group using the chosen passphrase in the way described above.

In a development the system could be modified so that a user could automatically activate a new file group by clicking on a preferred passphrase from the storage management utility interface.

In an alternative development, the storage management utility can have a feature to locate a new file group exactly after a known one. However, such a feature would have a disadvantage in that it could compromise the security of the new group if the existence of the first group is known.

In developments of the application 3, a facility to change passphrases can be provided. Changing of passphrases is not trivial due to the implications for relocating storage but could be accomplished easily by an experienced programmer.

In a further alternative, the application 3 can also provide the facility to de-allocate some file space from the file of random data so that it can be used as standard file space. However, this can have disadvantages as alluded to above since it suggests usage of the storage device.

The application 3 can provide security tools commonly associated with cryptography and steganography including secure deletion of unencrypted files, for example by multiple overwrites, the use of digital signatures and certificates, key management, partial screen blanking etc. It can also use established practices to avoid leaving traces of plain text passphrases or files on the host computer 5.

In a further development, the application 3 might have tools to securely preview files without accessing commercial software that might be less security aware. This can help to avoid, for example, traces of files becoming or remaining visible on the hard disk of a computer used to view stored files. As is well known standard word processors and other user applications typically have recently used file lists, and perform auto-saves etc. that could leave traces.

In an alternative approach, rather than supplying memory sticks including the application 3 and file of random data 4, the appropriate software could be distributed "on-line" to users with random numbers also available or generated by the user and software. However, from a security point of view this is a less desirable option and gives rise to network security considerations.

Whilst the above description has been written mainly in terms of the supply of removable storage devices and in particular USB memory sticks, it must be noted that in general terms the ideas and principles described above are equally applicable to other forms of removable storage device and to storage on non-removable storage devices. The storage devices may be used in conjunction with devices besides general purpose computers, such as digital cameras, mobile phones etc. In such cases the processors etc. provided in these devices are "computers" within the general meaning of the term as used in this application.

Further, it should be noted that a computer (in the general sense) arranged for operation by a program which causes the computer to carry out processes of the type described above, as well as such a program itself whether or not carried on a computer readable media should also be considered to embody the present invention. At the same time of course, the storage device itself and the methods and processes described above also embody the present invention.

The invention claimed is:

1. A method of storing a data set on a storage device having one or more portions of random data comprising:
    determining using a process dependent upon a user input passphrase, a first storage writing process starting location at a first offset within one of the portions of random data for initiating a first storage writing process for storing a file index;
    determining a second storage writing process starting location at a second offset within one of the portions of random data for initiating a second storage writing process for storing the data set, said second offset determined using a process that is independent of the process used to generate said first offset;
    encrypting the data set;
    writing the encrypted data set using the second storage writing process beginning at the second storage writing process starting location in one of the portions of random data; creating the file index including an entry in the file index in respect of the data set, the entry comprising an indication of the second storage writing process starting location;
    encrypting the file index; and
    writing the encrypted file index using the first storage writing process beginning at the first storage writing process starting location in one of the portions of random data.

2. A method of operating a computer to store a data set on a storage device, comprising:
    determining a first location at a first offset within the storage device for initiating a first storage writing process for storing a file index;
    determining a second storage writing process starting location at a second offset within the storage device for storing the data set, said second offset determined using a process that is independent of a process used to generate said first offset;
    encrypting the data set;
    writing the encrypted data set using a second storage writing process beginning at the second storage writing process starting location in a portion of random data;
    creating the file index including an entry in the file index in respect of the data set, the entry comprising an indication of the second storage writing process starting location;
    encrypting the file index; and
    writing the encrypted file index using the first storage writing process beginning at the first storage writing process starting location.

3. The method according to claim 1 in which the determining the first storage writing process starting location for creating the file index comprises adding a predetermined offset to the first storage writing process starting location as a beginning of the file index.

4. The method according to claim 1 wherein the encrypted file index is stored only within the portions of random data on the device.

5. The method according to claim 1 in which the encrypted file index is stored within one or more of the portions of random data by writing over random data portions within the storage device with the encrypted file index data.

6. The method according to claim 1 wherein the encrypted data set is stored only within the portions of random data.

7. The method according to claim 1 in which the encrypted data set is stored within one or more of the portions of random data by writing over random data portions within the storage device with the encrypted data set.

8. The method according to claim 1 which further comprises a using the user input passphrase for generating a key for encrypting the file index.

9. The method according to claim 1 in which the passphrase is used for generating a key for encrypting the data set.

10. The method according to claim 1 in which the passphrase is used in selecting the second storage writing process starting location.

11. The method according to claim 1 in which at least one of the first location within one of the portions of random data, the second location within one of the portions of random data, a key for the file index and a key for the data set is determined by using at least one hash function to operate on the user input passphrase.

12. The method according to claim 1 in which the passphrase is operated on once to produce an output which is used for determining at least two of the first location within one of the portions of random data, the second location within one of the portions of random data, a key for the file index and a key for the data set.

13. The method according to claim 1 in which the passphrase is operated on a plurality of times, each operation generating an output for use in determining at least one of the first location within one of the portions of random data, the second location within one of the portions of random data, a key for the file index and a key for the data set.

14. The method according to claim 1 in which a common key is used for encrypting the data set and for encrypting the file index.

15. The method according to claim 1 which comprises a step of storing further sets of data using said passphrase.

16. The method according to claim 15 which is such that a respective location for each data set is selected, each data set is encrypted and stored at the respective location, and respective entries are added to the file index.

17. The method according to claim 1, comprising a step of storing further file indexes within one of the portions of random data, each of which is associated with a respective passphrase and each of which is encrypted and is stored at a location selected in dependence on the respective passphrase.

18. The method according to claim 17 in which respective encryption keys are generated from the respective passphrases and these respective keys are used for encrypting data sets which are associated with each file index.

19. The method according to claim 17 comprising a step of selecting the passphrase for, and hence location for, an additional file index with knowledge of the respective passphrases corresponding to file indexes already stored in one of the portions of random data such that collisions may be avoided.

20. The method according to claim 17, in which, there are a plurality of file indexes stored in one of the portions of random data, the method comprises a step of selecting a location for an additional data set with knowledge of the respective passphrases corresponding to file indexes already stored in one of the portions of random data such that collisions may be avoided.

21. The method according to claim 17 comprising a step of storing additional data sets using an additional passphrase whilst in ignorance of at least one other existing passphrase.

22. The method according to claim 17 comprising a step of storing data sets in a predetermined relationship to a respective file index to help prevent collisions, for example the data sets may be stored adjacent to the respective file index, the data sets may be stored substantially contiguously to the respective file index, and the data sets may be stored at locations close to but after the respective file index.

23. The method according to claim 1 comprising a step of storing data on the storage device carrying a plurality of files of random data.

24. The method according to claim 1 in which the file index comprises a message authentication code.

25. The method according to claim 24 in which the file index comprises a message authentication code of all associated data sets so as to facilitate detection of tampering.

26. The method according to claim 24 in which the file index comprises a message authentication code of one of the portions of random data in its entirety for use in detecting other usage of one of the portions of random data.

27. The method according to claim 1 comprising a step of pre processing the data set prior to encryption.

28. The method according to claim 1 comprising a step of presenting a user with an indication of a location within one of the portions of random data that will be selected for the file index when using a predetermined passphrase.

29. The method according to claim 28 comprising a step of accepting user entered trial passphrases and providing a user with an indication of a location within one of the portions of random data that will be selected for the file index for each trial passphrase.

30. The method according to claim 28 comprising a further step of providing to the user an indication of the regions of one of the portions of random data that are already occupied by file indexes having passphrases that have been supplied by the user.

31. The method according to claim 1 comprising a step of receiving an indication from a user of a location within one of the portions of random data which the user desires to use for the file index.

32. The method according to claim 31 further comprising a step of suggesting possible passphrases to the user in response to the user indicating a location within one of the portions of random data which the user desires to use for the file index.

33. The method according to claim 31 comprising steps of receiving a user input passphrase and suggesting a modified passphrase.

34. The method according to claim 33 in which the modification of the passphrase is selected so as to at least one of: move a location at which an associated index would be stored towards a desired location indicated by a user and strengthen the passphrase.

35. The method according to claim 1 comprising a step of deleting the data set stored on the storage device.

36. The method according to claim 35 comprising a step of removing a respective entry from the file index.

37. The method according to claim 36 in which the step of deleting the data set comprises a step of overwriting the data set with random data as well as removing the entry from the file index.

38. The method according to claim 35 comprising a step of reorganizing data stored in association with the file index when at least one data set referenced in that file index is deleted.

39. The method according to claim 37 in which the step of overwriting the data set comprises a step of using at least one random data and encrypted data stored in one of the portions of random data for generating pseudo-random data for overwriting deleted files.

40. The method according to claim 39 in which the method comprises a step of using random numbers from one of the portions of random data that would be overwritten when adding a further data set to replace any pseudo-random values previously used elsewhere within one of the portions of random data.

41. A computer storage device for steganographically concealing stored information, said device configured with at least one storage area having one or more portions of random data containing a file index and a predetermined data set, and software carrying out steps wherein the file index is encrypted and is stored at a first location determined by an algorithmic process dependent upon a user passphrase, and the data set is encrypted and is stored at a second location determined using a process that is unconstrained by the process used to determine the first location, and the file index comprises an information indicative of the second location.

42. The storage device according to claim 41 further including application software stored thereon for execution by a computer to enable steganographic storage extraction of data sets in the one or more portions of random data.

43. The storage device according to claim 41 in which the passphrase is used to generate a key for at least one of encrypting the file index and encrypting the data set.

44. The storage device according to claim 41 further comprising a software application stored by the storage device, the software comprising instructions that when loaded and executed by a computer cause the computer to perform at least one of the following operations:
   accepting a plurality of user input passphrases and generating corresponding encryption/decryption keys;
   determining respective storage writing process starting locations for storage of a plurality of file indexes;
   encrypting the plurality of file indexes;
   encrypting aplurality of data sets;
   storing the plurality of file indexes;
   determining respective storage writing process starting locations for storing a plurality of data sets;
   storing the plurality of data sets;

accepting one or more user input passphrases and using said one or more user input passphrases for locating and decrypting the respective file indexes;

locating one or more encrypted data sets stored within the storage device: decrypting the one or more encrypted data sets stored within the storage device; and outputting the one or more decrypted data sets stored within the storage device as an encrypted data set.

45. The storage device according to claim 41 further including a conventional file allocation table stored thereon.

46. The storage device according to claim 41 wherein at least a portion of the device comprises a Read Only Memory (ROM).

47. The storage device according to claim 45 further comma Read Only Memory (ROM) portion wherein is stored the file allocation table, software and an operating system header file.

48. The storage device according to claim 41 wherein the device is operable as a removable storage device.

49. The storage device according to claim 41 wherein the device is assigned a particular identifying serial number.

50. The storage device according to claim 41 further including a unique hard coded identifier data stored in memory contained therein said identifier data for use by a computer for at least one of:
a) an encryption process used for encrypting at least one of the file index and the data set; and
b) a decryption process used for decrypting at least one of the file index and the data set.

51. The storage device according to claim 41 wherein the storage device has the appearance of a conventional portable memory storage device.

52. A computer configured under control of computer executable program code, said program code including instructions for configuring the computer to steganographically store a data set within one or more portions of random data contained on a digital data storage device coupled to said computer, comprising:

first storage writing process programmable logic circuitry configured to determine a first starting location within a portion of random data on the storage device for initiating a first storage writing process for storing a file index;

second storage writing process programmable logic circuitry configured to determine a second storage writing process starting location within a portion of random data on the storage device for storing the data set where said storage writing process starting location is determined independently from the process used to select the first location;

data set encryption programmable logic circuitry configured to encrypt the data set;

data set storing programmable logic circuitry configured to write an encrypted data set using a the second storage writing process beginning at the second storage writing process starting location;

file index programmable logic circuitry configured to create a file index including an entry in the file index in respect of the data set, the entry comprising an indication of a memory location within the storage device of the second storage writing process starting location;

file index encryption programmable logic circuitry configured to encrypt the file index;

and file index storing programmable logic circuitry configured to write an encrypted file index using the first storage writing process beginning at the first starting location.

53. The computer according to claim 52 further comprising file index location indicating programmed logic circuitry configured by said software to provide a user with a visual indication of a location within the portion of random data determined by said first storage writing process programmable logic circuitry to be used for storing the file index when a particular, passphrase is input by a user.

54. The computer according to claim 52 further comprising passphrase input processing programmed logic circuitry configured to accept user entered trial passphrases and provide a user with an indication of a location within a portion of random data determined for storing the file index for each trial passphrase entered by a user.

55. The computer according to claim 52 further comprising file index location programmed logic circuitry configured to provide a user an indication of regions of portions of random data that are already occupied by file indexes associated with passphrases supplied by a user.

56. The computer according to claim 52 further comprising passphrase suggestion programmed logic circuitry configured to suggest possible passphrases to a user in response to a user indicating a location within a portion of random data which a user desires to use for storing the file index.

57. The computer according to claim 53 further comprising user interface programmed logic circuitry configured to provide a user interface for displaying the visual indications on a display device connected to the computer.

58. The computer according to claim 57 in which the user interface programmed logic circuitry is configured so that a user can use a pointing device to select a location within a portion of random data to use for storing the file index.

59. A method of extracting a data set steganographically stored on a storage device having one or more portions random data containing a file index and a predetermined data set, wherein the file index is encrypted and is stored at a first location determined by an algorithmic process dependent upon a user input passphrase, and the data set is encrypted and is stored at a second location determined using a process that is unconstrained by the process used to determine the first location, and the file index comprises information indicative of the second location, comprising:

using a user input passphrase to determine a location for the file index based upon the user input passphrase;

decrypting the file index;

identifying a location of the data set from the decrypted file index; and decrypting the data set stored at the identified location.

60. A computer arranged under the control of software to extract data using the method according to claim 59.

61. A method of storing a data set on a storage device comprising:

determining a first location within the storage device for initiating a first storage writing process for storing a file index;

determining a second storage writing process starting location at a second offset within the storage device for storing the data set, said second offset determined using a process that is independent of a process used to generate said first location;

encrypting the data set;

writing the encrypted data set using a second storage writing process beginning at the second storage writing process starting location in a portion of random data;

creating a file index including an entry in the file index in respect of the data set, the entry comprising an indication of the second storage writing process starting location;

encrypting the file index; and writing the encrypted file index using the first storage writing process beginning at the first storage writing process starting location, the method further comprising, prior to a user finalizing a user input passphrase, accepting input of at least one user input trial passphrase and providing a user with an indication of a location within the portion of random data that will be determined for creating the file index associated with the at least one user input trial passphrase.

62. A computer readable data storage medium, said storage medium storing a computer program comprising code portions which when executed a computer cause the computer to perform steps of:

determining a first location within the storage medium for initiating a first storage writing process for storing a file index;

determining a second storage writing process starting location at a second offset within the storage medium for storing a data set said second offset determined using a process that is independent of a process used to determine said first location;

encrypting the data set;

writing the encrypted data set using a second storage writing process beginning at the second storage writing process starting location in a portion of random data;

creating the file index including an entry in the file index in respect of the data set, the entry comprising an indication of the second storage writing process starting location;

encrypting the file index; and writing the encrypted file index using the first storage writing process beginning at the first storage writing process starting location in the portion of random data.

63. A method of storing a data set on a computer accessible digital data storage device, comprising:

initializing one or more portions of a digital data storage area of the storage device with random data;

determining a first writing process starting location within a data storage portion initialized with random data for creating a file index;

determining a second writing process starting location within a data storage portion initialized with random data for storing the data set, said second writing process starting location determined using a process that is unconstrained by a process used to determine said first writing process starting location;

encrypting the data set;

storing the encrypted data set beginning at the second writing process starting location, using only data storage portions initialized with random data;

creating a file index indicative of which portions of the data storage device initialized with random data are to be used to store the encrypted data set;

encrypting the file index; and storing the encrypted file index beginning at the first writing process starting location.

64. The method according to claim 63 further comprising:
making an entry in the file index in respect of the data set, the entry comprising an indication of the second writing process starting location.

65. The method according to claim 63
wherein the first writing process starting location is determined in dependence upon one of an input information provided by a user to a computer accessing the storage device and a computing implemented determining process which is independent of user input.

66. The method according to claim 63 wherein the first writing process starting location is dependent upon a user input passphrase and the file index is associatedwith the user input passphrase.

67. The method according to claim 66 further comprising:
storing a second data set on the storage device wherein a writing process for storing the second data set is dependent upon a second user input passphrase, the process of storing the second data set on the storage device comprising:

determining, in dependence on the second user input passphrase, a third writing process starting location within a data storage portion initialized with random data for creating a second file index;

determining a fourth writing process starting location within a data storage portion initialized with random data for storing the second data set;

encrypting the second data set;

storing the encrypted second data set beginning at the fourth writing process starting location in a data storage area initialized with random data;

creating a file index indicative of which portion of the data storage device are used to store the encrypted second data set;

encrypting the second file index beginning at the third writing process starting location.

68. The method according to claim 63 wherein the one or more portions of the data storage area initialized with random data are reserved only for use in storing data.

69. The method according to claim 63 wherein one or more portions of the data storage area initialized with random data comprise a file of random data that is managed by a conventional file system management process on a computer accessing the storage device.

70. A digital data storage device for concealing stored information, said device having at least one data storage area containing random digital data, and having a file index and a data set that are steganographically stored in the data storage area containing random digital data, the file index being encrypted and located at one or more first storage locations within the data storage area containing random digital data, the data set being encrypted and located at one or more second storage locations within the data storage area containing random digital data where said one or more second storage locations are determined independently from the process used to determine the first storage location, the file index including information for identifying said second storage locations and indicating which parts of the data storage area containing random digital data are being used to store said data set.

71. A digital data storage device on which is stored a software application program and which includes at least one data storage area initialized with random data, the software application program comprising computer executable code portions which when executed by a computer cause the computer to:

determine one or more first storage locations within the random data to be used for storing a file index;

determine one or more second storage locations within the random data to be used for storing a data set, where said one or more second storage locations being determined by a process which is not constrained by the process used to select the first location;

encrypt the data set;

store an encrypted data set at one or more of said second storage locations;

create a file index containing information for identifying saib one or more second storage locations within the random data and for indicating which parts of the data storage area initilized with random data are being used to store the data set;

encrypt the file index; and store an encrypted file index said one or more first storage locations.

72. A method of storing a data set on a storage device having one or more portions of random data, comprising:

determining a first storage writing process starting location at a first offset within a portion of random data for initiating a first storage writing process for storing a data set;

determining a second storage writing process starting location at a second offset within a portion of random data for initiating a second storage writing process that creates a file index, said second offset determined independently from a process used to generate the first offset;

encrypting the data set;

writing the encrypted data set using said first storage writing process beginning at said first storage writing process starting location;

creating a file index having an entry in respect of the data set, the entry comprising at least an indication of the first storage writing process starting location;

encrypting the file index; and writing the encrypted file index using said second storage writing process beginning at said second storage writing process starting location.

73. The method of claim 72 wherein said second offset is determined using an algorithm that is dependent upon an input passphrase.

* * * * *